(12) United States Patent
Diewald

(10) Patent No.: US 6,968,276 B2
(45) Date of Patent: Nov. 22, 2005

(54) SYSTEM FOR PROCESSING MEASURING SIGNALS FROM A SENSOR

(75) Inventor: Horst Diewald, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 145 days.

(21) Appl. No.: 10/695,602

(22) Filed: Oct. 28, 2003

(65) Prior Publication Data

US 2004/0199339 A1 Oct. 7, 2004

(30) Foreign Application Priority Data

Nov. 19, 2002 (DE) ................. 102 53 899

(51) Int. Cl.[7] .............................................. G06F 19/00
(52) U.S. Cl. ........................................ 702/45; 702/189
(58) Field of Search ..................... 222/71; 250/356.1; 324/204; 700/282; 702/33, 45, 47, 50, 53, 702/127, 188, 189; 73/1.24; 137/386

(56) References Cited

U.S. PATENT DOCUMENTS

| | | | |
|---|---|---|---|
| 4,432,064 A * | 2/1984 | Barker et al. .................. | 702/9 |
| 4,516,213 A * | 5/1985 | Gidden ......................... | 702/62 |
| 4,713,608 A * | 12/1987 | Catiller et al. ............... | 324/142 |
| 4,804,957 A * | 2/1989 | Selph et al. ............ | 340/870.03 |
| 6,026,355 A * | 2/2000 | Rahman et al. ............. | 702/189 |

FOREIGN PATENT DOCUMENTS

| | | |
|---|---|---|
| DE | 31 42 468 A1 | 6/1982 |
| DE | 33 07 459 A1 | 9/1984 |
| DE | 36 12 121 A1 | 10/1987 |
| DE | 43 11 614 A1 | 10/1993 |
| DE | 295 21 924 U1 | 11/1998 |
| DE | 200 18 871 U1 | 3/2001 |
| DE | 100 02 275 A1 | 5/2001 |
| DE | 101 29 300 A1 | 2/2002 |
| WO | WO 00/36380 A1 | 6/2000 |

OTHER PUBLICATIONS

Getzlaff, S; Schreiter, J; Konig, A; "Systematic Design of an Embedded Neural System for Automated Visual Consumption Acquisition"; Proceedings Microelectronics for Neural, Fuzzy and Bio-Inspired Systems; Apr. 7-9, 1999; pp. 307-314.*

* cited by examiner

Primary Examiner—Bryan Bui
Assistant Examiner—Douglas N. Washburn
(74) Attorney, Agent, or Firm—J. Dennis Moore; W. James Brady, III; Frederick J. Telecky, Jr.

(57) ABSTRACT

A system for processing the measuring signals from a sensor 12, including of a first micro-controller 10 having an input for the sensor data, a first memory 18, 19 and a first processor 16, and a second micro-controller 24 having a second memory 26, 30 and a second processor 27. A bus system 22 is provided that connects the first micro-controller 10 with the second micro-controller 24. The first memory 18, 19 stores data and instructions that are configured so as to be adapted to the sensor 12 and enable the conversion of the signals provided by the sensor 12 into data representing the variable to be measured. The first processor 16 executes the instructions stored in the first memory 18, and transfers the resulting data by way of the bus system 22 to the second micro-controller 24. The second memory 26, 30 stores sensor-independent data and instructions, which enable the processing, by the second microprocessor 27, of the data transferred by the bus system 22, representing the variable to be measured.

11 Claims, 1 Drawing Sheet

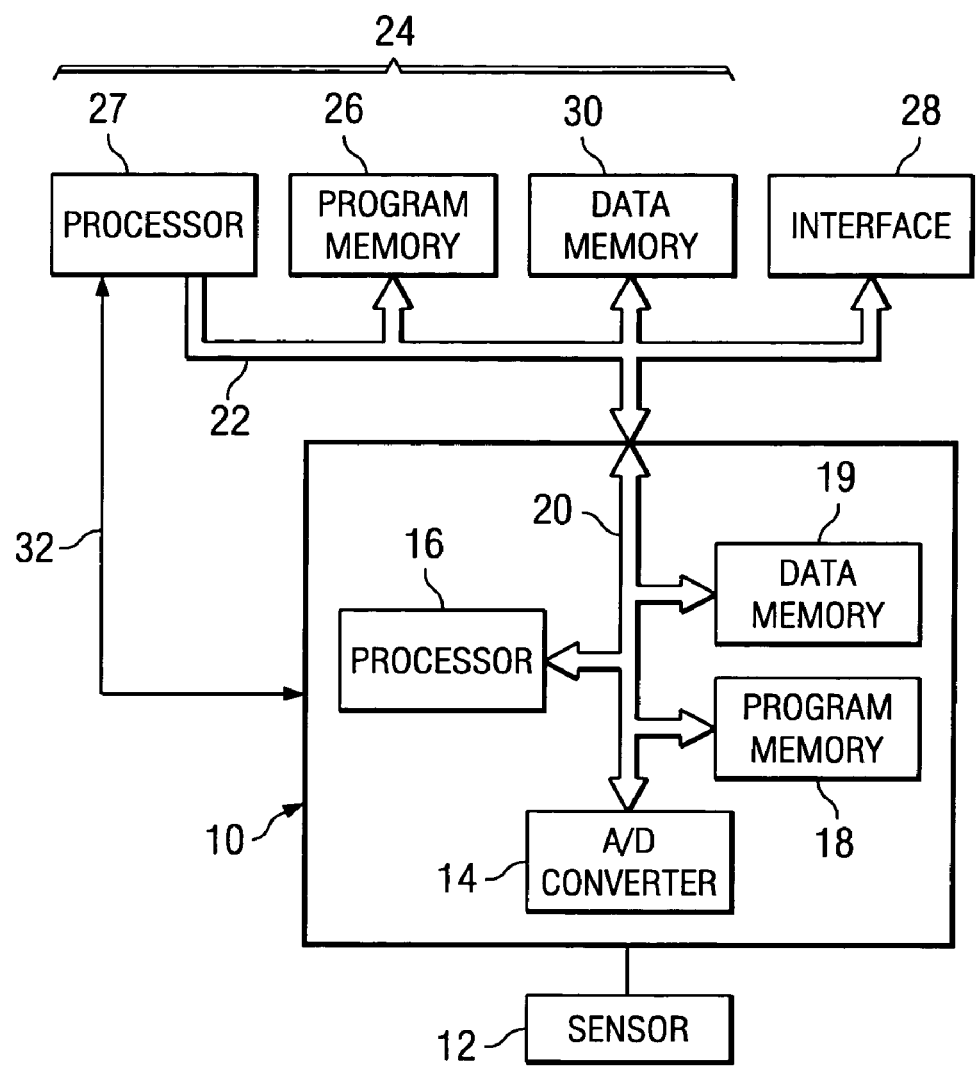

SYSTEM FOR PROCESSING MEASURING SIGNALS FROM A SENSOR

FIELD OF THE INVENTION

The invention relates to an electronic system for processing the measuring signals from a sensor.

BACKGROUND OF THE INVENTION

To measure the consumption of heat, gas, water or electricity, the corresponding suppliers are more and more turning to electronic devices, in favor of the mechanical consumption meters previously employed.

The consumption meters usually comprise a sensor that, for example in the case of an electricity meter, may consist of a resistor array, and a system for receiving and processing the measuring signals supplied by the sensor, which in the following shall be referred to as the signal processing system.

The signal processing system, on the one hand, must convert the measuring signals delivered by the sensor into real-time data that are representative of the physical magnitudes being measured and, on the other hand, must be able to process the data so acquired, in order, for example, to compute the energy cost by means of a tariff reference table, or to process the data in such a way that they can be fed to a digital display.

In the case of known consumption meters, the signal processing system may consist, for example, of a processor and a memory, where the data required for both the different processing functions, as well as the instructions, are stored.

An example of an electronic water meter using such a signal processing system is described in the application report SLAA138 of Texas Instruments, published in January 2002. To process the sensor signals, a Texas Instruments micro-controller of the MSP430 family is used in this case, which can be connected to a sensor by way of an analog interface and an analog to digital converter. This micro-controller has both a processor and a memory. The program stored in the memory is configured so as to enable the processor to process the data from the sensor, as well as to output the measured result on an LCD display.

Such a system has considerable disadvantages in practical terms, in particular with respect to flexibility when having to deal with changing sensor properties. It could then become necessary that the data and commands stored in the memory of the processor, as far as they are involved in the conversion of the sensor signals into measured data, will have to be changed when the sensor is replaced by a new sensor model. Since the sensors can differ from each other, depending on the conditions prevailing during the production of the sensors, thus making it necessary, for example, to store different calibration data or calibration algorithms for different sensors in the memory of the processor. Individual characteristics of the sensors, such as amplification, characteristic curves or output offset voltages must under certain circumstances be taken into consideration. Filters may also be used to suppress interference carried by the analog sensor signals, so that their influence on the measured signals will also have to be taken into account.

Modifying the data and commands, necessary for the conversion of the sensor signals, is also laborious because the tasks to be handled by the processor must be carried out on two different time bases. Sensor-dependent commands are processed in real time, while commands that are not dependent on the sensor, such as the computation of energy costs by means of an energy tariff reference table of an energy provider, need not be processed in real time and so can be handled at a lower clock rate. It follows that modifications of the data and commands in the memory of the processor, that are not dependent on the sensor output, are usually very labor-intensive to implement.

SUMMARY OF THE INVENTION

The present invention provides a system for processing the measured signals of a sensor that, by simple means, will allow a plurality of individual characteristics of sensors react in a flexible way to modifications relating to the sensors, process the measured signals at pre-determined temporal sequences and convert them into physical measured variables, as well as output the measured variables.

In an embodiment of the invention, a system for processing the measuring signals from a sensor comprises a first microcontroller comprising an input for the sensor data, a first memory and a first processor, and a second microcontroller comprising a second memory and a second processor, as well as a bus system that connects the first micro-controller with the second micro-controller, whereby the first memory stores data and instructions that are configured so as to be adapted to the sensor and enable the conversion of the signals provided by the sensor into data representing the variable to be measured, and whereby the first processor is embodied in such a way that it can execute the instructions stored in the first memory, and thereby convert in real-time the measured signals of the sensor into data that represent the measured variable, and transfer these data by way of the bus system to the second micro-controller, whereby the second memory stores sensor-independent data and instructions, which enable the processing of the data transferred by the bus system, representing the variable to be measured, and whereby the second processor is embodied so as to be able to execute the sensor-independent instructions.

An advantage of embodiments of the present invention is more flexibility to incorporate changes relating to the sensor, which is achieved in that a first micro-controller processes instructions that take into consideration the individual properties of the sensor and can be easily modified so that the measured signals from different sensor types can be processed in realtime. Further processing of the measured data, such as to output them for a display, or the conversion into energy cost values by means of a tariff reference table, is by means of a second micro-controller with its own program and data memory, so that any required modifications to the program processes being executed by the first and/or the second micro-controller, respectively, will not have any influence on each other. This means that this system for processing the measuring signals from a sensor can be adapted very easily to the respective requirements that are made on either the sensor (such as modifying the calibration of the sensor) or on the further processing procedure of the data (such as tariff changes).

BRIEF DESCRIPTION OF THE DRAWINGS

The invention shall be explained in the following by making reference to the attached drawing, where FIG. 1 is a block diagram, showing in schematic form an embodiment version of the system for processing the signals measured by a sensor, according to the invention.

DETAILED DESCRIPTION OF THE EMBODIMENTS

FIG. 1 shows an embodiment of a system for processing the signals measured by a sensor, according to the invention. The system comprises a first micro-controller 10 that can acquire the signals from a sensor 12. To this end, either an analog-digital converter may be connected between the sensor 12 and the first micro-controller 10, or, as shown in FIG. 1, the analog-digital converter 14 may be integrated into the first micro-controller 10. The first microcontroller 10 furthermore contains a first processor 16, a first program memory 18 and a first data memory 19. The first processor 16, the analog-digital converter 14, the first data memory 19, and the first program memory 18 are interconnected by way of an address/data bus 20. The first micro-controller 10 is configured so that the first processor 16 can read in the data digitalized by the analog-digital converter 14, which represent the measuring signals from the sensor 12. The address/data bus 20 therefore constitutes a connection for the sensor data to the input of the first micro-controller 10. The first processor 16 can furthermore load and/or execute data and instructions that are stored in either the first data memory 19 or in the first program memory 18, respectively.

The address/data bus 20 also enables the first micro-controller 10 to exchange data with a bus system 22. A second micro-controller 24 is connected to this bus system 22. The second micro-controller 24 comprises a second processor 27, a second program memory 26, as well as a second data memory 30. It is furthermore possible to connect an external unit (not shown in FIG. 1) to the bus system 22 by way of an interface 28 of the second micro-controller. The second micro-controller 24 is configured in such a way as to enable it to exchange data with the second program memory 26, the second data memory 30, the unit and the first micro-controller 10, by way of the bus system 22. The unit connected to the interface 28 may consist, for example, of an LCD display. Other units are, however, also possible, such as a timer, which will be discussed in more detail further on. The second program memory 26 and the second data memory 30 both again store data and instructions that can be executed by the second processor 27.

The bus system 22 can furthermore also be provided with a special interface for the purpose of uploading the corresponding data and instructions into the first program memory 18 and the first data memory 19, as well as into the second program memory 26 and the second data memory 30.

The operation of the system according to the invention shall be described in the following by considering the case where the sensor consists of a resistor array intended to measure the voltage and the current in a power supply line to a consumer. The system according to the invention here serves to measure the energy consumed. This is not to be construed as to be a limitation, since it is obvious to the expert how the disclosed invention may also be applied to other sensor types and be used with other measured variables.

A resistor array that meets the above-mentioned requirements is normally configured in a way that the sensor outputs a specific relation of the mains voltage by way of a voltage divider and, by means of a shunt resistor, converts the current flowing through the main line into a corresponding voltage drop.

The object of the first micro-controller 10 is to use the measured signals from the sensor 12 to determine the electric energy consumed. To this end, data and instructions are stored in both the first data memory 19 and in the first program memory 18, which are configured in a way as to be adapted to the properties of the sensor 12. The data and instructions may, for example, store information of the precise value of the individual resistors of the resistor array. Furthermore, even possible non-linearities of an amplifier connected to the sensor, as well as its amplification factor, may be stored. If a filter has been provided to suppress interference carried by the sensor signals, its effect on the measured signals must also be taken into account in the data and instructions. In a system for processing measured signals according to the invention, all the information relating to the sensor type, individual characteristics of the sensor or the properties of the sensor makeup are normally all taken into consideration in the data and instructions of both the first data memory 19 and the first program memory 18. Before first use is made of the system according to the invention, these data and instructions may be read into the first data memory 19 and in the first program memory 18 by way of the above-mentioned interface, which may, for example, be embodied as a JTAG (joint test activity group) interface.

The first processor 16 reads the measured signals, digitalized by the analog-digital converter 14, at a pre-determined frequency rate, 10 kHz for example in the case of an electronic electricity consumption meter, and computes the real consumption of electricity with the help of the data and instructions stored in the first data memory 19 and in the first program memory 18. To this purpose, the data and instructions stored in the first data memory 19 and in the first program memory 18 are configured so that the first processor 16 can convert the measured signals that represent both the voltage of the mains and the current flowing through the supply line at a given moment, into an electric power consumption value, and can, for example, determine the phase relationship between the current values and the voltage values from the temporal progression of the measured signals. This consumption value, representing the parameter to be measured, can be transferred to the second micro-controller 24 by way of the bus system 22. The computing power of the first micro-controller 10 must be such as to allow the measured signals to be processed at the required clock rate and in real-time.

The second micro-controller 24 acquires the measured values computed by the first micro-controller 10. The object of the second micro-controller 24 is to further process and to output the parameters to be measured. To this purpose, the second data memory 30 and the second program memory 26 store sensor-independent data and instructions that can be read and executed by the second processor 27, and that can be configured so that the second processor 27 can output the measured values on an LCD display (not shown in FIG. 1), by way of the interface 28.

The unit connected to the interface 28 may, however, also be configured so that it can be connected to a radio remote system. This would make it possible to read the consumption values by means of a radio interrogation device. The required control of the transfer protocol (such as the generation of check sums for the data to be transferred) would in this case also be taken care of by the second micro-controller 24, by means of the sensor-independent data and instructions.

By way of the bus system, the second micro-controller 24 can furthermore be connected to a timer unit, which is connected to the interface 28. The second processor 27 can read out timing information from the timer unit, with the help of instructions stored in the second program memory 26, in order to correlate the actual consumption values with the timing information from the timer unit. The sensor-independent data and instructions stored in the second program memory 26 and in the second data memory 30 can be configured so that the second microcontroller 24 can take into consideration different tariffs within a supply tariff structure, depending on the time of day, and directly output the finish-computed current consumption costs.

Electronic consumption measuring devices are often supplied with energy by a battery that is meant to supply the metering system with energy over a relatively long period of time, such as several years. This implies that all circuit components of the system for processing measured signals according to the invention must have a low power consumption. In particular, the system for processing measured data should be capable of switching itself off during periods of time when no signal from the sensor is received, as when, for example, no energy is consumed at that time. To prevent the loss of the instructions for the program control of the first micro-controller 10 and for the evaluation of the sensor signals, as well as the previously computed measured values, when the system is in its switched-off state, the first data memory 19 and the first program memory 18 may be embodied, at least in part, as a non-volatile memory. Suitable for this purpose is, for example, a flash memory that is connected to the internal address/data bus 20. Correspondingly, the second data memory 30 and the second program memory 26 can equally be embodied in non-volatile form.

Since both the first micro-controller 10 and the second micro-controller 24 depend on access to the bus system 22, suitable measures must be in place to prevent any possible data collision in the case of simultaneous access attempts by the two micro-controllers. For this reason, the system according to the invention is provided with one or more transmission links 32 that may be used for access control. The second micro-controller 24 may, for example, be configured so that on reception of a request signal from the first micro-controller 10, by way of the transmission link 32, for access to the data bus 22, it can grant access permission by means of a confirmation signal sent over the transmission link 32.

The system for processing the signals measured by a sensor, according to the invention, is quickly and easily adaptable to different sensor types. When, for example, a new sensor type is put to use, it will only be necessary to modify the sensor-relevant data (such as a calibration reference table) and instructions (such as commands for the computation of the measured value by the new sensor), which are stored in the first data memory 19 and in the program memory 18, without having to interfere with the program and the data that are to be retrieved by the second processor 27 from the second program memory 26 and/or the second data memory 30. This means that only commands relating to time-critical processing of the sensor signals (real-time processing) have to be changed.

If, however, there only is a change in the sensor-independent data and commands, such as a modification of the tariff system of the energy supplier, it will only be necessary to modify the data in the second data memory 30 and/or the programs in the second program memory 26, that is only programs relating to temporal non-critical processing procedures (in comparison with the real-time processing of the sensor signals).

This means that this system can be adapted to changing circumstances without the need for complex modifications. This results in reduced production costs for the electronic consumption meters that are equipped with the system according to the invention, since the system according to the invention is suitable for many applications and can, therefore, be produced in large batch numbers. By modifying the instructions, the properties of different sensor types, different methods for the calibration of the sensors or individually fitted filters for the measured analog signals can be allowed for by simple means. The further processing of the measured signals into measured values, which has to be accomplished in real time, is furthermore completely separated from the sensorindependent output of the measured values, so that differing processing requirements, as well as the output format, can be accommodated in a simple manner.

What is claimed is:

1. A system for processing the measuring signals from a sensor comprising:

a first micro-controller, comprising an input for the sensor data, a first memory and a first processor, a second micro-controller comprising a second memory and a second processor;

a bus system that connects the first micro-controller with the second micro-controller, wherein the first memory stores data and instructions that are configured so as to be adapted to the sensor and enable the conversion of the signals provided by the sensor into data representing the variables to be measured, and wherein the first processor is connected such that it can execute the instructions stored in the first memory, and thereby convert in real-time the measuring signals of the sensor into data that represent the measurable variable, and transfer these data by way of the bus system to the second micro-controller, wherein the second memory stores sensor-independent data and instructions, which enable the processing of the data transferred by the bus system, representing the variable to be measured, and whereby the second processor is connected so as to be able to execute the sensor-independent instructions in the second memory, and wherein both the first memory and the second memory each comprise a data memory and a program memory.

2. A system according to claim 1 wherein the sensor-independent instructions stored in the second memory are configured so that the data processed by the second micro-controller can be output.

3. A system according to claim 2, further comprising an interface by means of which the data processed can be output.

4. A system according to claim 3, further comprising an output unit that is connected to the interface.

5. A system according to claim 1, further comprising an analog-digital converter connected between the sensor and the first micro-controller.

6. A system according to claim 1, wherein the second micro-controller is furthermore connected to a timer unit by way of the bus system.

7. A system according to claim 1, wherein the first microcontroller and the second micro-controller are furthermore connected to transmission links, which control the access to the bus system.

8. A system according to claim 1, wherein the sensor consists of a resistor array serving to measure voltage and/or current parameters.

9. A system according to claim 8, where the sensor is a flow meter to measure the consumption of gases or fluids.

10. An Electronic electricity consumption meter for processing the measuring signals from a sensor comprising:
- a first micro-controller, comprising an input for the sensor data, a first memory and a first processor,
- a second micro-controller comprising a second memory and a second processor;
- a bus system that connects the first micro-controller with the second micro-controller,
- wherein the first memory stores data and instructions that are configured so as to be adapted to the sensor and enable the conversion of the signals provided by the sensor into data representing the variables to be measured, and
- wherein the first processor is connected such that it can execute the instructions stored in the first memory, and thereby convert in real-time the measuring signals of the sensor into data that represent the measurable variable, and transfer these data by way of the bus system to the second micro-controller, and
- wherein the second memory stores sensor-independent data and instructions, which enable the processing of the data transferred by the bus system, representing the variable to be measured, and whereby the second processor is connected so as to be able to execute the sensor-independent instructions in the second memory, and wherein the second memory is configured so as to contain data and instructions that represent a current consumption tariff system, and where the further processing of the data representing the variable to be measured results in the computation of the electricity consumed.

11. An Electricity consumption meter according to claim 10, where the consumption tariffs are time-dependent and where the time information required for the computation of the electricity consumption costs are supplied by the timer.

* * * * *